May 25, 1965 M. J. COYLE 3,185,928
PULSE GENERATOR EMPLOYING PLURAL PULSE-FORMING-NETWORKS WITH
PULSE PRODUCING MEANS FOR CANCELLATION
OF UNDESIRABLE REFLECTED PULSE
Filed May 24, 1963

Michael J. Coyle,
INVENTOR.

BY Harry M. Saragovitz
Edward J. Kelly
Herbert Berl
Charles C. Wells

`United States Patent Office`

3,185,928
Patented May 25, 1965

3,185,928
PULSE GENERATOR EMPLOYING PLURAL PULSE-FORMING-NETWORKS WITH PULSE PRODUCING MEANS FOR CANCELLATION OF UNDESIRABLE REFLECTED PULSE
Michael J. Coyle, Bay Shore, N.Y., assignor, by mesne assignments, to the United States of America as represented by the Secretary of the Army
Filed May 24, 1963, Ser. No. 283,124
4 Claims. (Cl. 328—65)

This invention relates to pulse generating circuits for supplying high voltage pulses to load circuits that include microwave transmitter tubes such as klystrons, traveling wave tubes or magnetrons. More particularly the invention relates to a pulse generating circuit wherein means have been provided for preventing re-excitation of the load by eliminating reflected pulses between the load circuit and pulse generating circuit. It is frequently necessary, particularly in pulse radar applications, to supply high voltage pulses to load circuits, including microwave transmitter tubes. Many varied types of pulse generating circuits, such as shown in U.S. Patent No. 2,495,979, have been devised for providing such pulses. However, previous pulse generating circuits have not been entirely satisfactory because at the end of the useful output pulse supplied to the load circuit, an undesired impulse is transmitted from the load circuit to charge the pulse generating circuit. This charge is then reflected back to the load circuit causing re-excitation of the load. The undesired impulse is formed due to the discharge of the capacitance in the load circuit when the voltage in the pulse generating circuit drops to zero. This re-excitation of the load, particularly when the load includes a microwave transmitter tube, is objectionable in that it deteriorates the output signal from the microwave transmitter tube. In a conventional pulse generating circuit, the pulse forming networks are discharged in series across the load circuit and at the end of the output pulse an impulse is transmitted from the load circuit to each of the pulse forming networks. The undesired impulses, are of identical polarity and are reflected from the pulse forming networks back to the load circuit to re-excite the microwave transmitter.

The present invention provides a pulse generating circuit which avoids undesirable re-excitation by providing a thyratron tube in one of the pulse forming networks so that the network is terminated in a short circuit at the time the impulse arrives thereto. Due to the action of the thyratron the polarity of the impulse is reversed in the shorted pulse forming network. Thus, the impulses in the two pulse forming networks will be of opposite polarity and will cancel one another when they are reflected back to the load circuit. Hence there can be no re-excitation of the load.

It is the principal object of this invention to provide a pulse generating circuit wherein impulses transmitted thereto can be eliminated rather than reflected.

Further objects and advantages of this invention will be apparent as the description thereof progresses, reference being had to the accompanying drawings, wherein.

Figure 1:
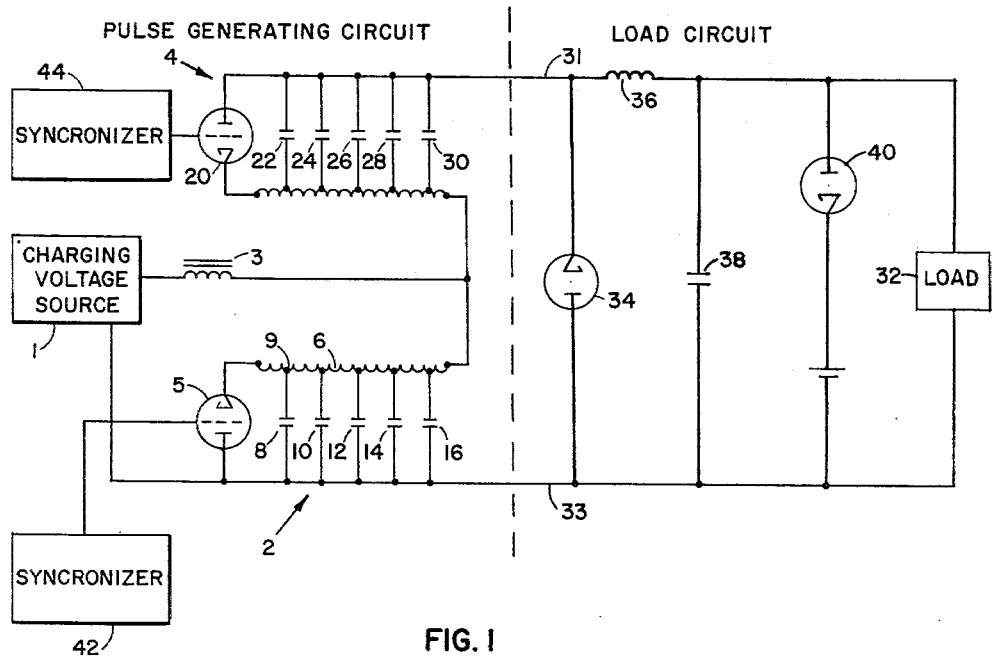
FIGURE 1 is a schematic diagram of a preferred embodiment of the invention.

Referring to FIGURE 1, a pulse generating circuit is connected so as to discharge through a load circuit. The pulse generating circuit includes a pair of pulse forming networks 2 and 4 which are charged from a charging voltage source 1 through a charging choke 3. Since resonant charging is involved, the pulse forming networks are charged to 2E or twice the potential of the charging source. Pulse forming network 2 includes five capacitors 8, 10, 12, 14 and 16 connected in parallel with respect to one another and each of these capacitors have one of their terminals commonly connected in series with the load circuit and the other of their terminals connected to taps 9 on coil 6. A thyratron 5 is connected to pulse forming network 2. When thyratron 5 is fired, the two pulse forming networks 2 and 4 are discharged to supply a pulse to the load circuit. The cathode of thyratron 5 is connected to a tap 9 on coil 6 and the plate of thyratron 5 is series connected to the load circuit. A synchronizer 42, which is a source of trigger pulses, is provided for firing the thyratron 5.

Pulse forming network 4 is similar in operation to pulse forming network 2 and includes five capacitors 22, 24, 26, 28 and 30. These five capacitors are connected in parallel and each have one of their terminals commonly connected in series with the load circuit and the other of their terminals connected to taps 23 on coil 18. A thyratron 20 is connected to pulse forming network 4, said thyratron having its plate series connected to the load circuit and its cathode connected to a tap 23 on coil 18. A synchronizer 44 connected to thyratron 20 provides a source of trigger pulses for firing thyratron 20 at the proper time.

The load circuit is connected to the pulse generating circuit through lines 31 and 33. The load circuit includes a pair of diodes 34 and 40, load 32, capacitor 38 and an inductance 36. The diodes, load and capacitor are connected in parallel with one another and in series with the inductance.

In operation, the two pulse forming networks 2 and 4 are charged from the charging voltage source to twice the potential of the charging source. A trigger pulse 7 (shown in FIGURE 2B) from synchronizer 42 is then supplied to thyratron 5. The trigger pulse causes thyratron 5 to fire and inverts the polarity of the charge on pulse forming network 2. The pulse forming networks 2 and 4 are then discharged in series and an initial high voltage pulse 13, having an amplitude of 4E, is applied to load 32. Shortly after the initial pulse is applied to the microwave transmitter diodes 38 and 40 begin to conduct. When the diodes conduct the load becomes matched and the voltage across the load drops to a value equal to 2E. At the end of pulse 13 the voltage in the pulse forming networks drops essentially to zero and condenser 38, which was charged by the initial high voltage pulse, starts to discharge into inductance 36 and into pulse forming networks 2 and 4. Thyratron 5 is not conducting at the time the impulse reaches the pulse forming networks so the pulse forming network 2 terminates in an open circuit. However, a trigger pulse 11, illustrated in FIGURE 2B, is applied to thyratron 20 causing it to be conducting when the impulse reaches pulse forming network 4. The action of thyratron 20 inverts the polarity of the impulse in pulse forming network 4 making it of opposite polarity to the impulse in pulse forming network 2. Thus, when the impulses are reflected from the pulse forming networks back toward the load circuit they are of opposite polarity and cancel one another.

Figure 2A:
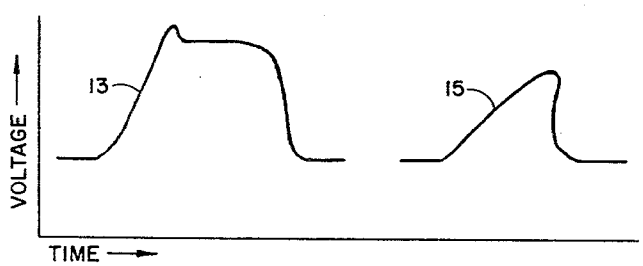
FIGURE 2A is a graphic illustration of the time sequence and waveform of the output and the reflected pulses from the pulse generating circuit.
Figure 2B:
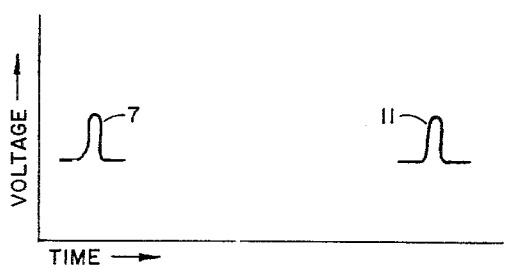
FIGURE 2B is a graphic illustration of the time sequence and waveform of the trigger pulses applied to the thyratron tubes by the synchronizers.

If the thyratron 20 were not included the impulses in each of the pulse forming networks would have identical polarity and a pulse 15, with a waveform illustrated in FIGURE 2A, would be reflected back to the load circuit. This would result in an undesirable re-excitation of the load.

This completes the description of the invention. However, many modifications thereof will be apparent to one skilled in the art without departing from the spirit and scope of the invention. Accordingly, it is desired that the invention described herein be limited only by the appended claims.

I claim:
1. A pulse generating circuit for supplying a high voltage pulse to a load free from re-excitation by reflected pulses, said circuit comprising:
   (a) a pair of series coupled pulse forming networks connected to said load,
   (b) a voltage source connected to said pulse forming networks for charging said networks to a desired potential,
   (c) means connected to one of said pulse forming networks for discharging said networks across said load, and
   (d) means connected to one of said pulse forming networks for reversing the polarity of an impulse transmitted thereto from the load, whereby the reflected pulses emerging from said pulse forming networks will be of opposite polarity and cancel one another.
2. A pulse generating circuit for supplying a high voltage pulse to a load, said circuit being constructed and arranged to eliminate undesired impulses transmitted from the load to prevent re-excitation of the load by reflected pulses, said circuit comprising:
   (a) a first pulse forming network connected in series with the load,
   (b) a second pulse forming network series coupled to said first pulse forming network and the load,
   (c) a voltage source connected to said pulse forming networks for charging said networks to a desired potential,
   (d) a triggering means included in said circuit for discharging said pulse forming networks in series across said load, and
   (e) means connected to said second pulse forming network for reversing the polarity of pulses transmitted thereto from said load, whereby the reflected pulses emerging from said pulse forming networks will be of opposite polarity and cancel one another so as to not re-excite the load.
3. A pulse generating circuit as in claim 2 wherein said triggering means includes:
   (a) a thyratron tube connected in parallel with said first pulse forming network, and
   (b) a synchronizer connected to said thyratron for supplying trigger pulses thereto.
4. A pulse generating circuit as in claim 2 wherein the means connected to said second pulse forming network comprises:
   (a) a thyratron tube connected in parallel with said second pulse forming network, and
   (b) a synchronizer connected to said thyratron for supplying trigger pulses thereto.

References Cited by the Examiner
UNITED STATES PATENTS
2,474,243   6/49   Greenwald _____ 328—67

ARTHUR GAUSS, *Primary Examiner.*